United States Patent Office 3,749,724
Patented July 31, 1973

3,749,724
CERTAIN 2-MERCAPTO-PYRIDO[2,3-d] PYRIMIDINE-4 (3H)-ONES
Fritz Wiedemann and Max Thiel, Mannheim, Kurt Stach, Mannheim-Waldhof, Egon Roesch, Lampertheim, and Klaus Hardebeck, Ludwigshafen (Rhine), Germany, assignors to Boehringer Mannheim GmbH, Mannheim, Germany
No Drawing. Filed Nov. 25, 1970, Ser. No. 92,935
Claims priority, application Germany, Dec. 11, 1969, P 19 62 057.6; July 21, 1970, P 20 36 063.8
Int. Cl. C07d 57/20
U.S. Cl. 260—256.5 R                    10 Claims

ABSTRACT OF THE DISCLOSURE

New 2 - mercapto-pyrido[2,3-d]pyrimidin-4(3H)-one compounds of the formula

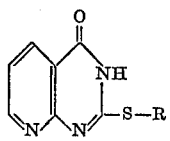

and physiologically compatible salts thereof, possess exceptional diuretic and natriuretic activity.

---

The present invention is concerned with new 2-mercapto[2,3-d]pyrimidin-4(3H)-one compounds and with pharmaceutical compositions containing these new compounds.

The 2-mercapto-pyrido[2,3-d]pyrimidin - 4(3H) - one compounds according to the present invention are compounds of the general formula:

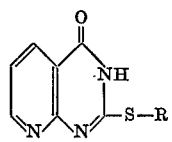

wherein R is lower alkyl, lower alkenyl, aralkyl or aryl which can be substituted by one or two hydroxyl, alkoxy, e.g., lower alkoxy, carboxyl, carbalkoxy, e.g., lower alkoxy carbonyl, or aminocarbonyl groups; and the salts thereof with physiologically compatible acids and bases.

Thus, "R" can be, for example, methyl, ethyl, propyl, butyl, hexyl, octyl, or decyl; or propenyl, allyl, butenyl, octenyl, or decenyl; or benzyl, phenethyl, 1- (or 2-) naphthylmethyl, etc., or phenyl, naphthyl; and these radicals may be substituted with, e.g., hydroxy, methoxy, ethoxy, butoxy, or decyloxy, carboxyl, carbopropoxy, carbobutoxy, or aminocarbonyl.

We have found that the new compounds according to the present invention have a good diuretic and natriuretic activity.

The new compounds according to the present invention can be prepared, for example, by one of the following methods:

(a) Reaction of compounds of the general formula:

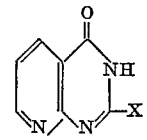

with compounds of the general formula:

R—Y     (III)

in which R has the same meaning as above, one of the symbols X and Y stands for a mercapto group and the other stands for a reactive ester group; or (b) Partial hydrolysis of bis-S-substituted 2,4-dimercapto-pyrido[2,3-d]pyrimidines of the general formula:

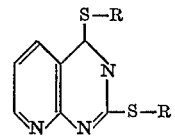

in which R has the same meaning as above; whereafter, if desired, a functional group in the substituent R is converted, in known manner, into a hydroxyl, alkoxy, carboxyl, carbalkoxy or aminocarbonyl group and, if desired, the compounds obtained are converted into their physiologically compatible salts.

For carrying out the process according to the present invention, a mercapto compound of General Formula II or III in aqueous or alcoholic solution is converted into the corresponding mercaptide by the addition of a strong base, preferably sodium hydroxide or a sodium alcoholate, and then reacted with the appropriate compound of General Formula III or II, in which Y or X is a reactive ester group.

As reactive esters, it is preferred to use the halides but the sulfuric acid esters and the sulfonic acid esters, for example, the tosylates and brosylates, can also be used.

Normally, the reaction proceeds at ambient temperature with satisfactory reaction velocities. However, for acceleration of the reaction, it is also possible to employ elevated temperatures. If low boiling point solvents or readily volatile mercaptans are used, then it is recommended to use a pressure apparatus in order to be able to raise the temperature sufficiently.

The partial hydrolysis of the bis-S-substituted 2,4-dimercapto-pyrido[2,3-d]pyrimidines of General Formula IV can be carried out by boiling with a strong base, preferably with sodium hydroxide, in aqueous or aqueous alcoholic solution. If the substituent R is hydrophobic, then it is advantageous to add solubilizing agents. In this case, the mercapto group in the 4-position is preferentially hydrolyzed.

The derivatives of General Formula II used as starting materials, in which X represents a mercapto group, can be obtained, for example, by the reaction of thiourea with 2-amino-nicotinic acid in the melt.

The compounds (IV) can be obtained either by the reaction of 2,4-dichloro-pyrido[2,3-d]pyrimidine with an excess of mercaptans of General Formula III or by the reaction of 2-amino-nicotinic acid nitrile, in the presence of a strong base, with carbon disulfide. The 2,4-dimercapto-pyrido[2,3-d]pyrimidine thus obtained is reacted with 2 mole of a compound (III), in which Y represents a reactive ester group. The process conditions used correspond to those used for process (a).

If the substituent R still contains a functional group, such as a carboxyl group, a carbalkoxy group or an aminocarbonyl group, this can subsequently be converted into another group in known manner by esterification, amidation or hydrolysis.

For conversion into their salts, the compounds of General Formula I are mixed in aqueous solution with the calculated amount of a physiologically compatible acid or base and the solution then evaporated to dryness in a vacuum.

For the use of the new compounds according to the present invention as pharmaceuticals with diuretic or natriuretic action, there can, in principle, be used all the conventional enteral and parenteral forms of administration. For this purpose, the active material is mixed with a solid or liquid pharmaceutical carrier or diluent and then brought into a suitable form for administration. Examples of solid carriers which can be used include lactose, mannitol, starch, talc, methyl-cellulose, gelatine and the like, to which, if desired, can be added coloring materials and/or flavorings. Because of the low solubility of the new compounds according to the present invention, very few solvents, for example dimethyl sulfoxide, can be considered for the preparation of injectable solutions. Consequently, high concentrations are preferably administered in the form of suspensions.

In human medicine, the enteral administration of active material in amounts of from 10 to 500 mg. per day, in 1 to 4 individual doses, has proved to be useful. In the case of intravenous administration, the most favorable amounts of active material are between 5 and 100 mg. per day.

The new compounds according to the present invention, which are characterized by a good and surprisingly long-lasting (6–24 hours) diuretic action, bring about in the organism an increased excretion of sodium ions without influencing the excretion of potassium ions. Consequently, the new compounds according to the present invention differ from the previously known diuretic compounds, which either bring about an increased excretion of sodium and potassium ions or bring about an excretion of sodium ions and, at the same time, a retention of potassium ions. However, the new pharmaceutical compositions according to the present invention provide the physician with a new means of treating patients with a disturbed soduim balance but with a normal potassium balance.

The following examples are given for the purpose of illustrating the present invention, but are not to be construed as limitative thereof:

EXAMPLE 1

Preparation of 2-methylmercapto-pyrido[2,3-d]pyrimidin-4(3H)-one

Variant A: Methyl mercaptan was passed at ambient temperature into a solution of sodium ethylate, prepared from 15.7 grams sodium and 157 ml. ethanol, until saturation point was reached. The sodium mercaptide solution obtained was mixed with a solution of 56.6 grams 2-chloropyrido[2,3-d]pyrimidin - 4(3H) - one in 566 ml. ethanol and heated in an autoclave for 7 hours at 130° C. The reaction mixture was evaporated to dryness in a vacuum, the residue was taken up in water, the aqueous solution was treated with activated charcoal and the filtrate was mixed with 2 N hydrochloric acid up to pH 5. The mixture was then filtered wtih suction and the material obtained washed with water. There were obtained 49.6 grams (82.7% of theory) 2-methylmercapto-pyrido[2,3-d]pyrimidin-4(3H)-one in the form of colorless crystals with a melting point of 237–241° C. The corresponding hydrochloride had a melting point of >300° C., the corresponding sulfate (containing water of crystallization) a melting point of 253–255° C. and the corresponding sodium salt (containing water of crystallization) a melting point of >300° C.

Variant B: A solution of 6.6 grams sodium hydroxide in 150 ml. water was saturated with methyl mercaptan at ambient temperature and mixed with 13.5 grams 2-chloropyrido[2,3-d]pyrimidin-4(3H)-one. The clear solution obtained was left to stand for 48 hours at ambient temperature, then adjusted to pH 4 with 2 N hydrochloric acid and the material obtained was filtered off with suction and washed with water. There were obtained 13.7 grams (95.5% of theory) 2 - methylmercapto - pyrido[2,3-d]pyrimidin-4(3H)-one, with a melting point of 238–240° C.

Variant C: 1.8 grams 2-mercapto-pyrido[2,3-d]pyrimidin-4(3H)-one were dissolved in 35 ml. 2 N sodium hydroxide solution, 1.1 ml. methyl iodide were added thereto and the reaction mixture was stirred for 3.5 hours at ambient temperature. After treating the reaction mixture with a little activated charcoal, it was acidified with 6 N hydrochloric acid to pH 5 and filtered to give 1.2 grams (62% of theory) 2-methylmercapto-pyrido[2,3-d]pyrimidin-4(3H)-one, which had a melting point of 238–240° C.

Variant D: 0.22 gram finely powdered 2,4-bis-methylmercaptopyrido[2,3-d]pyrimidine were heated under reflux for 50 minutes in 10 ml. 1 N sodium hydroxide solution. After cooling, the reaction mixture was adjusted to pH 4 with 6 N hydrochloric acid. The product obtained was filtered off with suction and washed with water. There were obtained 0.15 gram (79% of theory) 2-methylmercapto-pyrido[2,3-d]pyrimidin - 4(3H) - one, which had a melting point of 239–240° C.

The 2,4-bis-methylmercapto - pyrido[2,3-d]pyrimidine used as starting material was prepared in the following manner:

2.40 grams methyl mercaptan were added at 3° C. to a solution of 1.76 grams sodium hydroxide in 25 ml. water and 25 ml. methanol and after 10 minutes, 4.0 grams finely powdered 2,4 - dichloro-pyrido[2,3-d]pyrimidine were added, while stirring. The reaction mixture was stirred for 4 days at ambient temperature in a closed vessel, then filtered off with suction and washed with a mixture of methanol and water. There were thus obtained 4.1 g. (92% of theory) 2,4-bis-methylmercapto-pyrido[2,3-d]pyrimidine in the form of pale yellow crystals with a melting point of 150–151° C.

EXAMPLE 2

Preparation of 2-ethylmercapto-pyrido[2,3-d]pyrimidin-4(3H)-one 6.2 g. ethyl mercaptan were added to a solution of 3.3 g. sodium hydroxide in 50 ml. water. 6.0 g. 2-chloropyrido[2,3-d]pyrimidin-4(3H)-one were introduced, with stirring, into the mercaptide solution obtained, whereafter the solution was left to stand for 60 hours at ambient temperature. It was then acidified to pH 5 with 2 N hydrochloric acid and the 2-ethylmercapto-pyrido[2,3-d]pyrimidin-4-(3H)-one which precipitated out was separated off and recrystallised from water, with the use of activated charcoal. There were obtained 3.92 g. (57.3% of theory) of the desired compound in the form of colourless crystals with a melting point of 159–161° C.

EXAMPLE 3

Preparation of 2-n-propylmercapto-pyrido[2,3-d]pyrimidin-4(3H)-one 11.4 g. n-propyl mercaptan were introduced into a solution of sodium ethylate, prepared from 2.53 g. sodium and 100 ml. ethanol, whereafter 9.0 g. 2-chloropyrido[2,3-d]pyrimidin-4(3H)-one were introduced and the reaction mixture then heated in an autoclave for 7 hours at 130° C. the reaction mixture was evaporated to dryness in a vacuum and the residue was taken up with water, treated with activated charcoal and the filtrate was adjusted to pH 5 with 2 N hydrochloric acid, the product obtained then being filtered off with suction. There were obtained 6.2 g. (62.4% of theory) of still slightly coloured 2-n-propylmercapto-pyrido[2,3-d]pyrimidin-4(3H)-one, which has a melting point of 183–184° C. By recrystallisation from ethanol, with the use of activated charcoal, the product was obtained in the form of colourless crystals which had a melting point of 187–188° C.

EXAMPLE 4

Preparation of 2-isopropylmercapto-pyrido[2,3-d]pyrimidin-4(3H)-one 5.0 g. isopropyl mercaptan were added, under an atmosphere of nitrogen, to a solution of 2.3 g. sodium hydroxide in 45 ml. water and, after 45 minutes, 4.7 g. 2-chloropyrido[2,3-d]pyrimidin - 4(3H)-one were introduced. The reaction mixture was heated to 50° C. for 22.5 hours, cooled and acidified with 2 N hydrochloric acid to pH 5. Solid material was filtered off with suction and washed with water and the crude yellow product obtained (4.5 g.; M.P. 115–125° C.) was recrystallised from ether, with the use of activated charcoal. There were obtained 2.0 g. (35% of theory) colourless 2-isopropylmercaptopyrido[2,3-d]pyrimidin-4(3H)-one, with a melting point of 147–149° C.

EXAMPLE 5

2-allylmercapto-pyrido[2,3-d]pyrimidin-4(3H)-one 10 ml. allyl mercaptan were added, under an atmosphere of nitrogen, to a solution of 4.2 g. sodium hydroxide in 100 ml. water and, after 30 minutes, 9.05 g. 2-chloro-pyrido[2,3-d]pyrimidin - 4(3H)-one were introduced, while stirring. The reaction mixture was left to stand for 4 days at ambient temperature. After the addition of 2 N hydrochloric acid until the pH was 5, the solid material was filtered off with suction, washed with water and the residue recrystallised from ether, with the use of activated charcoal (an insoluble part remains behind). There were obtained 3.5 g. (32% of theory) 2-allylmercapto-pyrido[2,3-d]pyrimidin-4(3H)-one in the form of colourless crystals with a melting point of 169–171° C.

EXAMPLE 6

Preparation of 2-(2-hydroxyethylmercapto)[2,3-d]pyrimidin-4(3H)-one 2.1 ml. mercaptoethanol were added, under an atmosphere of nitrogen, to a solution of 1.0 g. sodium hydroxide in 20 ml. water and, after 15 minutes, 1.81 g. 2-chloropyrido[2,3-d]pyrimidin-4(3H)-one were introduced, with stirring. The reaction mixture was left to stand for 21 hours at ambient temperature, then adjusted to pH 5 with 2 N hydrochloric acid. Solid material was filtered off with suction, washed with water and recrystallised from ethanol, with the use of activated charcoal, to give 0.95 g. (42.6% of theory) 2-(2-hydroxyethylmercapto)-pyrido[2,3-d]pyrimidin-4(3H)-one in the form of colourless crystals with a melting point of 355° C. (decomp.).

EXAMPLE 7

Preparation of S-pyrido[2,3-d]pyrimidin-4(3H)-on-2-yl-mercaptoacetic acid methyl ester A solution of 4.0 g. sodium hydroxide in 100 ml. water was mixed, under an atmosphere of nitrogen, with 12.7 g. methyl mercaptoacetate and, after 30 minutes, 7.24 g. 2-chloropyrido[2,3-d]pyrimidin - 4(3H)-one were introduced with stirring. The reaction mixture was left to stand for 63 hours at ambient temperature and solid material was then filtered off with suction and washed with water. After recrystallisation of the crude product from methanol, with the use of activated charcoal, there were obtained 2.7 g. (27% of theory) S-pyrido[2,3-d]pyrimidin-4(3H)-on-2-yl-mercaptoacetic acid methyl ester in the form of colourless crystals with a melting point of 211–212° C. (decomp.).

EXAMPLE 8

Preparation of S-pyrido[2,3-d]pyrimidin-4(3H)-on-2-yl-mercaptoacetic acid ethyl ester 36 g. ethyl mercaptoacetate were added, under an atmosphere of nitrogen, to a solution of 10 g. sodium hydroxide in 200 ml. water and, after 15 minutes, 18.1 g. 2-chloropyrido[2,3-d]pyrimidin-4(3H)-one were introduced, with stirring. After 24 hours, the pH was adjusted to 5 by the addition of 2 N hydrochloric acid. The solid material was filtered off with suction and washed with water to give 11.6 g. S-pyrido[2,3-d]pyrimidin-4(3H)-on-2-yl-mercaptoacetic acid ethyl ester, with a melting point of 173–176° C. After recrystallisation from benzene, with the use of activated charcoal, there were obtained 8.0 g. (30% of theory) of the desired product in the form of colourless crystals with a melting point of 181–182° C.

EXAMPLE 9

Preparation of S-pyrido[2,3-d]pyrimidin-4(3H)-on-2-yl-mercaptoacetamide 4.0 g. S-pyrido[2,3-d]pyrimidin-4(3H)-on-2-yl-mercaptoacetic acid ethyl ester were left to stand for 24 hours at ambient temperature in 60 ml. concentrated ammonia solution, whereafter the reaction mixture was evaporated to dryness in a vacuum and the residue recrystallised from ethanol, with the use of activated charcoal. There were obtained 1.7 g. (48% of theory) S-pyrido[2,3-d]pyrimidin-4(3H)-on-2-yl-mercaptoacetamide in the form of colourless crystals which melt, with decomposition, above 225° C.

The same compound was obtained when, in a manner analogous to that described in Example 8, 2-chloropyrido-[2,3-d]pyrimidin-4(3H)-one was reacted with mercaptoacetamide in a dilute solution of sodium hydroxide.

EXAMPLE 10

Preparation of S-pyrido[2,3-d]pyrimidin-4(3H)-on-2-yl-mercaptoacetic acid 2.3 g. mercaptoacetic acid were added, under an atmosphere of nitrogen, to a solution of 2.0 g. sodium hydroxide in 25 ml. water and, after 15 minutes, 1.82 g. 2-chloropyrido[2,3-d]pyrimidin-4(3H)-one were introduced, with stirring. After 4 hours, a clear solution was obtained. This was left to stand for 24 hours at ambient temperature, then acidified with 2 N hydrochloric acid to a pH of 3. Solid material was filtered off with suction and the product obtained was recrystallised from water, with the use of activated charcoal. There were obtained 0.7 g. (29.5% of theory) S-pyrido[2,3-d]pyrimidin-4(3H)-on-2-yl-mercapto-acetic acid in the form of colourless crystals which melt, with decomposition, at about 250° C.

The same compound can also be obtained by the hydrolysis of the compounds obtained in Examples 7, 8 and 9.

EXAMPLE 11

Preparation of 2-benzylmercapto-pyrido[2,3-d]pyrimidin-4(3H)-one

A solution of 2.7 g. benzyl mercaptan in 25 ml. methanol were added, under an atmosphere of nitrogen, to a solution of 0.84 g. sodium hydroxide in 50 ml. water and, after 20 minutes, 3.63 g. 2-chloropyrido[2,3-d]pyrimidin-4-(3H)-one were added thereto. After stirring the reaction mixture for 24 hours at ambient temperature, a clear solution was obtained. Subsequently, separation of an oil took place which oil soon solidified. After a total of 68 hours, the solid material was filtered off with suction, washed with water and the crude product, obtained in an amount of 3.5 g. (61% of theory), was recrystallised from benzene, with the addition of activated charcoal. There were thus obtained 1.8 g. (33% of theory) 2 - benzylmercapto - pyrido[2,3-d]pyrimidin-4(3H)-one in the form of colourless crystals with a melting point of 194–195° C.

EXAMPLE 12

Preparation of 2-phenylmercapto-pyrido[2,3-d]pyrimidin-4(3H)-one

A solution of 2.2 ml. thiophenol in 25 ml. methanol was combined with a solution of 0.84 g. sodium hydroxide in 50 ml. water, whereupon, after 20 minutes, 3.63 g. 2-chloropyrido[2,3-d]pyrimidin-4(3H)-one were added, under an inert gas atmosphere, while stirring. Stirring was continued for 72 hours and solid material was filtered off with suction, washed with water and the crude product obtained then recrystallised from ethanol, with the addition of activated charcoal. There were obtained 3.5 g. (68.5% of theory) 2-phenylmercapto-pyrido[2,3-d]pyrimidin-4(3H)-one in the form of colourless crystals with a melting point of 226–228° C.

EXAMPLE 13

Preparation of 2-(2-methoxyethylmercapto)-pyrido[2,3-d]pyrimidin-4(3H)-one 3.3 g. 2-methoxyethylmercaptan were introduced, under an atmosphere of nitrogen, into a solution of 1.6 g. sodium hydroxide in 40 ml. water and, after 20 minutes, 3.63 g. 2-chloropyrido[2,3-d]pyrimidin-4(3H)-one were added, with stirring. The reaction mixture was then left to stand for 40 hours at ambient temperature. After the addition of 2 N hydrochloric acid until the pH is 5, the solid material obtained was filtered off with suction and recrystallised from water. There were obtained 2.8 g. (59% of theory) 2-(2-methoxyethylmercapto)-pyrido[2,3-d]pyrimidin-4(3H)-one in the form of colourless crystals with a melting point of 149–150° C.

EXAMPLE 14

Preparation of 2-(2,2-dimethoxyethylmercapto)-pyrido[2,3-d]pyrimidin-4(3H)-one 18.3 g. mercaptoacetaldehyde dimethylacetal were added, under an atmosphere of nitrogen, to a solution of 4.0 g. sodium hydroxide in 100 ml. water and then 9.0 g. 2-chloro-pyrido[2,3-d]pyrimidin - 4(3H)-one were added, with stirring. The reaction mixture was left to stand for 64 hours at ambient temperature, then adjusted to pH 7 by the addition of 2 N hydrochloric acid and extracted with chloroform, the extract evaporated and the residue recrystallised from benzene. There were obtained 6.0 g. (45% of theory) 2-(2,2-dimethoxyethylmercapto) - pyrido[2,3-d]pyrimidin-4(3H)-one in the form of colourless crystals with a melting point of 141–143° C.

In an analogous manner, by reaction with mercaptoacetaldehyde diethyl acetal, there was obtained, in a yield of 59% of theory, 2-(2,2-diethoxyethylmercapto)-pyrido[2,3-d]pyrimidin-4(3H)-one, in the form of colourless crystals with a melting point of 147–148° C.

In order to demonstrate the diuretic and natriuretic activity of the instant compounds the following tests were carried out using compounds representative of the invention.

The following were the test compounds:

| Compound: | |
|---|---|
| A[1] | 2-methyl 4 hydroxy pyrido [2,3 d] pyrimidin |
| 1 | 2 methylmercapto-pyrido-[2,3-d] pyrimidin-4(3H) one |
| 2 | 2 ethylmercapto-pyrido-[2,3-d]-pyrimidin-4(3H)-one |
| 3 | 2-allylmercapto-pyrido-[2,3-d]-pyrimidin-4(3H)-one |
| 4 | 2-(2-hydroxy-ethylmercapto)-pyrido-[2,3-d]-pyrimidin-4(3H)-one |
| 5 | 2-(2-methoxy-ethylmercapto)-pyrido-[2,3-d]-pyrimidin-4(3H)-one. |
| 6 | 2-(2,2-diethoxy-ethylmercapto)-pyrido-[2,3-d]-pyrimidin-4(3H)-one. |
| 7 | 2-(2,2-dimethoxy-ethylmercapto)-pyrido-[2,3-d]-pyrimidin-4(3H)-one. |

[1] Comparison compound.

The following tests were employed:

(A) Experiments on rats.—Female Sprague Dawley rats each having a weight between 140 and 200 grams, were maintained in a fasting condition overnight but were allowed an unlimited amount of drinking water. These rats have been maintained for at least one week prior to the experiments in climatized rooms held at 23°±1° C. and at a relative humidity of 60±5%. During the experiments the animals were placed into metabolic cages, 5 rats per cage. The test compound was administered orally in a 0.5% methyl cellulose solution or suspension (10 ml./kg.). After 2 hours had elapsed, and again after six hours had elapsed, the animal's bladders were pressed out and the volume of urine measured and the chloride content of the urine determined titrametrically and flame photometrically with Na+ and K+. The results of this series of experiments are set forth in Table I below.

TABLE I

| Text compound | Threshold dosage (in mg./kg.) for excretion of— | | Maximum excretion | |
|---|---|---|---|---|
| | Urine | Na+ | Urine (ml./k.g) | Na+ (milliequivalent/kg.) |
| A | 6 | 6 | 34 | 3.9 |
| 1 | 0.75 | 0.75 | 41 | 5.1 |
| 2 | <6 | <6 | 36 | 2.5 |
| 3 | <12 | <12 | ≧41 | ≧2.9 |
| 4 | 1.5 | 1.5 | ≧35 | ≧6.6 |
| 5 | 6 | 6 | 44 | 6.8 |
| 6 | <25 | <25 | ≧36 | ≧2.1 |
| 7 | <25 | <25 | ≧33 | ≧3.1 |

Compound 1 was further tested in comparison with Compound A. The dosage of administered compound was varied and otherwise the test procedure was as described above for Table I. The rats were fed 15 mm. pellets and each compound was applied to three groups of 5 rats each. Both urine and sodium excretion was measured after 2 hours and after six hours and both the oral route (see Table II, below) and the peritoneal route (see Table III, below) were used.

TABLE II.—COMPARISON OF EFFECTIVENESS OF COMPOUND A AND COMPOUND 1 WITH RESPECT TO INFLUENCING URINE AND SODIUM EXCRETION IN RATS BY ORAL ADMINISTRATION

| Dosage, (mg./kg.) | 0-2 hours | | | | 0-6 hours | | | |
|---|---|---|---|---|---|---|---|---|
| | Urine, ml./kg. | | Na+, milliequivalent/kg. | | Urine, ml./kg. | | Na+, milliequivalent/kg. | |
| Control | 9.1 ±0.8 | | 0.103 ±0.009 | | 12.7 ±1.0 | | 0.43 ±0.037 | |
| | Compound A | Compound 1 | Compound A | Compound 1 | Compound A | Compound 1 | Compound A | Compound 1 |
| 0.75 | | 11.9 ±0.7 | | 0.23 ±0.04 | | 18.3 ±0.8 | | 0.92 ±0.09 |
| 3 | 6.0 ±1.0 | 14.3 ±0.5 | 0.074 ±0.016 | 0.48 ±0.03 | 10.4 ±0.78 | 34.2 ±1.6 | 0.37 ±0.04 | 2.4 ±0.14 |
| 6 | 10.5 ±1.1 | | 0.37 ±0.086 | | 19.8 ±2.3 | | 1.1 ±0.19 | |
| 12 | 9.8 ±1.0 | 17.5 ±0.8 | 1.04 ±0.13 | 0.86 ±0.04 | 34.0 ±1.7 | 41.1 ±1.5 | 3.9 ±0.25 | 3.0 ±0.14 |
| 25 | 6.7 ±0.87 | | 0.94 ±0.13 | | 21.1 ±1.2 | | 2.98 ±0.31 | |
| 50 | 3.4 ±0.53 | 19.7 ±1.2 | 0.47 ±0.09 | 1.6 ±0.09 | 15.5 ±1.6 | 38.4 ±1.4 | 2.04 ±0.22 | 3.7 ±0.12 |
| 100 | 1.9 ±0.44 | | 0.254 ±0.067 | | 12.0 ±2.3 | | 1.58 ±0.36 | |
| 200 | | 17.6 ±1.2 | | 2.1 ±0.08 | | 23.1 ±0.9 | | 5.1 ±0.22 |

TABLE III.—COMPARISON OF EFFECTIVENESS OF COMPOUND A AND COMPOUND 1 WITH RESPECT TO INFLUENCING URINE AND SODIUM EXCRETION IN RATS BY INTRA-PERITONEAL ADMINISTRATION

| Dosage, (mg./kg.) | 0-2 hours | | | | 0-6 hours | | | |
|---|---|---|---|---|---|---|---|---|
| | Urine, ml./kg. | | Na+, milliequivalent/kg. | | Urine, ml./kg. | | Na+, milliequivalent/kg. | |
| Control | 6.3 ±0.4 | | 0.053 ±0.010 | | 9.1 ±0.48 | | 0.166 ±0.018 | |
| | Compound A | Compound 1 | Compound A | Compound 1 | Compound A | Compound 1 | Compound A | Compound 1 |
| 0.75 | | 9.7 ±0.8 | | 0.12 ±0.026 | | 17.0 ±1.6 | | 0.166 ±0.18 |
| 1.5 | 5.3 ±0.56 | | 0.033 ±0.006 | | 8.0 ±0.68 | | 0.152 ±0.02 | |
| 3 | 6.1 ±0.83 | 10.8 ±1.1 | 0.117 ±0.033 | 0.37 ±0.069 | 9.8 ±0.92 | 27.4 ±2.6 | 0.269 ±0.072 | 1.9 ±0.226 |
| 6 | 6.9 ±0.91 | | 0.39 ±0.051 | | 24.2 ±2.0 | | 1.89 ±0.22 | |
| 12 | 6.3 ±0.44 | 12.4 ±1.5 | 0.72 ±0.069 | 0.59 ±0.113 | 27.4 ±1.8 | 31.0 ±2.5 | 3.32 ±0.21 | 2.3 ±0.242 |
| 25 | 5.0 ±0.56 | | 0.61 ±0.05 | | 18.2 ±3.3 | | 2.12 ±0.46 | |
| 50 | 2.2 ±0.54 | 16.4 ±0.8 | 0.28 ±0.068 | 1.2 ±0.081 | 14.5 ±1.2 | 33.0 ±1.2 | 1.67 ±0.16 | 3.0 ±0.164 |
| 100 | 0.7 ±0.24 | 9.9 ±0.9 | 0.071 ±0.027 | 1.1 ±0.098 | 7.7 ±2.0 | 27.6 ±1.5 | 0.91 ±0.26 | 2.8 ±0.183 |
| 200 | | 2.2 ±0.5 | | 0.19 ±0.062 | | 14.7 ±0.9 | | 1.7 ±0.129 |

It can be seen from Tables I, II and III that Compound 1 was already markedly superior to Compound A with respect to threshold dosage and this was true for oral as well as intraperitoneal administration. After administration of 3 mg./kg., orally or intraperitoneally, Compound 1 effected a very good increase in water and sodium excretion. At this dosage Compound A was not effective. Compound 1 was also superior to Compound A with respect to peak effectiveness in water excretion. With respect to sodium excretion Compound 1 was superior to Compound A in all except a small dosage range.

(B) Experiments on dogs.—The test animals were female episiotomized beagles having a weight of 10 to 15 kg. These animals were maintained prior to and during the experiments in climatized rooms held at 23±1° C. and relative humidity of 60±5%. Beginning the evening prior to the day of the experiments the dogs were maintained in a fasting condition (having been fed with 4 mm. pellets) but permitted free access to drinking water. In the last half-hour prior to beginning of the experiments and during the last half-hour of each collection period bladder catheters were introduced. The amount of urine so collected was measured and its content in Na+ and K+ determined flame photometrically and Cl— determined titrametrically. The test compounds were administered in 0.5% methyl cellulose suspension (1 ml./kg.) through a stomodaeum probe followed by application of 30 ml. water. The results are set forth in Table IV.

TABLE IV.—COMPARISON OF THE EFFECTIVENESS OF COMPOUND A AND COMPOUND 1 IN INFLUENCING THE URINE AND SODIUM EXCRETION OF DOGS VIA ORAL ADMINISTRATION

| Dosage, (mg./kg.) | 0-2 hours | | | | 0-6 hours | | | |
|---|---|---|---|---|---|---|---|---|
| | Urine, ml./kg. | | Na+, milliequivalent/kg. | | Urine, ml./kg. | | Na+, milliequivalent/kg. | |
| | Compound A | Compound 1 | Compound A | Compound 1 | Compound A | Compound 1 | Compound A | Compound 1 |
| Control | 1.3 ±0.14 | | 0.05 ±0.01 | | 3.7 ±0.36 | | 0.16 ±0.05 | |
| 0.25 | | 1.9 ±0.42 | | 0.15 ±0.08 | | 4.3 ±0.83 | | 0.30 ±0.13 |
| 0.5 | 2.0 | 2.5 ±0.63 | 0.06 | 0.11 ±0.06 | 4.8 | 5.1 ±0.68 | 0.13 | 0.18 ±0.06 |
| 1 | | 2.9 ±0.38 | | 0.22 ±0.05 | | 8.0 ±0.08 | | 0.35 ±0.05 |
| 2 | 2.9 | 4.8 ±0.48 | 0.14 | 0.25 ±0.04 | 8.3 | 17.8 ±1.0 | 0.44 | 0.91 ±0.11 |
| 5 | 2.5 | 3.5 ±0.82 | 0.19 | 0.31 ±0.07 | 13.1 | 15.8 ±2.1 | 0.93 | 1.51 ±0.26 |
| 10 | 1.4 | 2.2 ±0.4 | 0.16 | 0.43 ±0.11 | 4.0 | 9.1 ±1.7 | 0.57 | 1.48 ±0.27 |
| 20 | | 2.2 ±0.44 | | 0.33 ±0.08 | | 9.2 ±1.1 | | 1.43 ±0.22 |
| 25 | 1.8 | | 0.28 | | 6.3 | | 1.07 | |
| 40 | 1.6 | | 0.18 | | 3.8 | | 0.50 | |

It can be seen from Table IV that in the dog tests Compound 1 was superior to Compound A at all dosage rates, both in respect of water excretion and in respect of sodium excretion.

It will be understood that the foregoing specification and examples are illustrative and not limitative of the present invention in that many other embodiments of the invention will suggest themselves to those skilled in the art.

What is claimed is:

1. 2 - mercapto-pyrido[2,3-d]pyrimidin - 4(3H)-one compounds of the formula

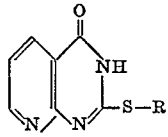

wherein R is lower alkyl or lower alkenyl of from 1 to 10 carbon atoms, benzyl, phenethyl, or phenyl or naphthyl, which may be unsubstituted or substituted with one or two hydroxy, alkoxy of up to 4 carbon atoms, carboxy, carbalkoxy of up to 4 carbon atoms or aminocarbonyl groups and physiologically compatible salts thereof.

2. Compound as claimed in claim 1 wherein R is lower alkyl.

3. Compound as claimed in claim 1 wherein R is lower alkenyl.

4. Compound as claimed in claim 1 wherein R is hydroxy-lower alkyl.

5. Compound as claimed in claim 1 wherein R is lower alkoxy-lower alkyl.

6. Compound as claimed in claim 1 designated as 2-methylmercapto-pyrido[2,3-d]pyrimidin-4(3H)-one.

7. Compound as claimed in claim 1 designated as 2-ethylmercapto-pyrido[2,3-d]-pyrimidin-4(3H)-one.

8. Compound as claimed in claim 1 designated as 2-allylmercapto-pyrido[2,3-d]-pyrimidin-4(3H)-one.

9. Compound as claimed in claim 1 designated as 2-(2 - hydroxy-ethylmercapto)-pyrido[2,3-d]-pyrimidin - 4(3H)-one.

10. Compound as claimed in claim 1 designated as 2 - (2-methoxy-ethylmercapto)-pyrido[2,3-d]-pyrimidin-4(3H)-one.

References Cited

UNITED STATES PATENTS 2,697,710  12/1954  Hitchings et al. ____ 260—256.5

RICHARD J. GALLAGHER, Primary Examiner

U.S. Cl. X.R.

424—251